(12) United States Patent
Tormasov et al.

(10) Patent No.: US 10,176,309 B2
(45) Date of Patent: Jan. 8, 2019

(54) SYSTEMS AND METHODS FOR AUTHENTICATING VIDEO USING WATERMARKS

(71) Applicant: Acronis International GmbH, Schaffhausen (CH)

(72) Inventors: Alexander Tormasov, Moscow (RU); Victor Lysenko, Moscow (RU); Mark Shmulevich, Moscow (RU); Stanislav Protasov, Moscow (RU); Serguei M. Beloussov, Costa Del Sol (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 15/797,043

(22) Filed: Oct. 30, 2017

(65) Prior Publication Data

US 2018/0121635 A1    May 3, 2018

Related U.S. Application Data

(60) Provisional application No. 62/414,171, filed on Oct. 28, 2016.

(51) Int. Cl.
| | |
|---|---|
| *G06F 21/16* | (2013.01) |
| *G06F 21/64* | (2013.01) |
| *H04L 9/32* | (2006.01) |

(52) U.S. Cl.
CPC ............ *G06F 21/16* (2013.01); *G06F 21/645* (2013.01); *H04L 9/3297* (2013.01); *G06F 2221/0737* (2013.01); *H04L 2209/38* (2013.01); *H04L 2209/608* (2013.01)

(58) Field of Classification Search
CPC .................. G06F 21/16; G06F 21/645; G06F 2221/0737; H04L 9/3297; H04L 2209/608; H04L 2209/38
See application file for complete search history.

(56) References Cited

U.S. PATENT DOCUMENTS

| | | | | |
|---|---|---|---|---|
| 7,561,714 B2 * | 7/2009 | Tian | ..................... | G06T 1/0028 |
| | | | | 382/100 |
| 8,107,668 B2 * | 1/2012 | Lowe | .................. | H04N 1/32144 |
| | | | | 380/201 |
| 8,627,482 B2 * | 1/2014 | Bloom | ................... | H04N 7/163 |
| | | | | 380/277 |
| 9,418,395 B1 * | 8/2016 | Gish | ..................... | G06T 1/0021 |
| 2003/0007664 A1 * | 1/2003 | Davis | .................... | G06T 1/0021 |
| | | | | 382/100 |
| 2004/0101160 A1 * | 5/2004 | Kunisa | .................. | G06T 1/0028 |
| | | | | 382/100 |
| 2009/0217052 A1 * | 8/2009 | Baudry | ................. | G06T 1/0085 |
| | | | | 713/178 |

(Continued)

*Primary Examiner* — Darren B Schwartz
(74) *Attorney, Agent, or Firm* — Arent Fox LLP (57) ABSTRACT

Disclosed are blockchain-based methods and systems for watermarking digital content. In an exemplary aspect, a method for watermarking digital content is provided, by receiving, by a processor, a data stream comprising audio and/or video content; receiving watermark data, by a processor, from a computing node communicatively linked to a blockchain-based distributed ledger; and applying at least one watermark to the data stream based upon the watermark data, wherein the watermark comprises at least one hash based on one or more data blocks stored in the blockchain-based distributed ledger.

17 Claims, 6 Drawing Sheets

(56) References Cited

U.S. PATENT DOCUMENTS

| | | | |
|---|---|---|---|
| 2010/0098326 A1* | 4/2010 | Abeloe | H04N 21/235 382/154 |
| 2011/0007935 A1* | 1/2011 | Reed | G06T 1/0028 382/100 |
| 2013/0223671 A1* | 8/2013 | Jin | H04N 21/8358 382/100 |
| 2014/0040982 A1* | 2/2014 | Marshall | G06F 21/00 726/2 |
| 2014/0086408 A1* | 3/2014 | Bickmore | H04N 21/42684 380/210 |
| 2015/0016661 A1* | 1/2015 | Lord | H04N 21/42203 382/100 |
| 2015/0063625 A1* | 3/2015 | Martin | H04N 1/32325 382/100 |
| 2015/0286843 A1* | 10/2015 | Brant | G06F 21/16 713/178 |
| 2016/0203572 A1* | 7/2016 | McConaghy | G06F 21/10 705/58 |
| 2016/0283920 A1* | 9/2016 | Fisher | G06Q 20/065 |
| 2016/0300234 A1* | 10/2016 | Moss-Pultz | G06Q 20/3829 |
| 2016/0352793 A1* | 12/2016 | Lee | H04L 65/4076 |

\* cited by examiner

SYSTEMS AND METHODS FOR AUTHENTICATING VIDEO USING WATERMARKS

CROSS-REFERENCE TO RELATED APPLICATION

The application claims priority to U.S. Provisional Patent Application No. 62/414,171, which was filed on Oct. 28, 2016, the contents of which is incorporated herein by reference.

TECHNICAL FIELD

The disclosure generally relates to the field of data authentication and verification, and more specifically to systems and methods for authenticating video and other digital files using watermarking.

BACKGROUND

In recent years, digital video recording has become ubiquitous, whether for entertainment, security or myriad other purposes. This widespread increase in video recording has been spurred at least in part by a reduction in costs for recording equipment and the incorporation of video cameras into mobile devices (e.g., cell phones) favored by consumers. Corporations and businesses are also becoming increasingly reliant on video recording for security and communication. However, recorded video has a key drawback in that it is normally difficult, if not impossible, to reliably authenticate a video.

One of the main issues related to authentication is the determination of the time that a video was recorded. Video cameras are normally equipped with a timer, which automatically indicates the date and time of a recording. However, this information can be easily forged or otherwise falsified at the time of recording or in post-processing. To avoid this, users may place an artifact in the frame when the video is recorded that has a known date of creation (or publication). In theory, the presence of this artifact acts as a certification that the video was not created before the date of creation or publication of the artifact. However, this only provides an unreliable approximation as to the earliest date or time that a video recording may have been created and usually does not provide an upper boundary as to the latest possible date or time that the video may have been created.

As an example, a newspaper published on a specific date may be placed into the frame. This serves as nominal confirmation that the recording was not made in advance of the newspaper's date of publication, as this issue of the newspaper did not exist. However, there is always the possibility that an artifact may be added or removed from a recorded video in post-processing using video manipulation software. As such, this method is not completely reliable when implemented. Also, this method typically requires forethought on the part of the user with respect to selection and use of a suitable artifact at the time of recording. In most cases, absent advance planning, there is unlikely to be a suitable artifact in frame that is suitable for tentative authentication.

Therefore, there exists a need for methods and systems that can reliably authenticate digital video recordings without requiring specific video content (i.e., in-frame artifacts associated with a given date or time), and which are resistant to falsification and manipulation.

BRIEF SUMMARY

Disclosed are methods for video authentication using watermarks based upon blockchain technology or random number generation. Such methods are resistant to forgery or manipulation and are compatible with standard digital video recording equipment. Moreover, unlike artifact based methods, these newly disclosed watermarking process is content-independent and provides a precise and reliable timestamp that does not suffer from the approximation and upper boundary issues noted above. Further advantages over the current art will be readily apparent in view of the full disclosure.

In one exemplary aspect, a method for video authentication is provided, comprising: receiving video data, by a processor, from a video recorder; receiving watermark data, by a processor, from at least one external source, wherein the external source comprises a blockchain network or a random number generator; and applying at least one watermark to the video data based upon the watermark data, wherein the watermark comprises a unique timestamp.

In some exemplary aspects, the watermark data comprises at least one of: a) a hash associated with a unique data block in the blockchain network; or b) a cryptographically secure pseudorandom number.

In some exemplary aspects, the watermark is applied to a metadata field associated with the video data.

In some exemplary aspects, the watermark is applied to the video data in a nondestructive operation that does not degrade the visual quality of the video data.

In some exemplary aspects, the applying step comprises applying multiple watermarks to the video data at a preset interval while video data is received from the video recorder.

In some exemplary aspects, the interval is selected from: a) one watermark per second; b) one watermark every 5, 10, 30, or 60 seconds; or c) an arbitrary interval selected by a user of the video recorder.

In some exemplary aspects, wherein the watermark comprises: a) at least two random numbers or hashes associated with unique data blocks in the blockchain network, which correspond to the interval of time in which the video data was received from the video recorder; b) at least one random number or hash associated with a unique data block in the blockchain network, which corresponds to a start time of the video data received from the video recorder; c) at least one random number or hash associated with a unique data block in the blockchain network, which corresponds to an end time of the video data received from the video recorder. In another exemplary aspect, a system for video authentication is provided comprising: a video recorder, configured to record video data; a processor, configured to receive watermark data from at least one external source, wherein the external source comprises a blockchain network or a random number generator; and apply at least one watermark to the recorded video data based upon the watermark data, wherein the watermark comprises a unique timestamp.

In some exemplary aspects, the system includes one or more hardware or virtual processors configured to perform any of the methods disclosed herein.

In another exemplary aspect, a non-transitory computer readable medium comprising computer executable instructions for video authentication is provided, including instructions for: performing any of the methods disclosed herein, to video data received from a video recorder.

The above simplified summary of exemplary aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the disclosure that follows. To the accomplishment of the foregoing, the one or more aspects of the disclosure include the features described and particularly pointed out in the claims. Moreover, it is understood that the individual limitations of elements of any of the disclosed methods, systems and software products may be combined to generate still further aspects without departing from the spirit of the present disclosure and the inventive concepts described herein.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Exemplary aspects of the present disclosure are described herein in the context of methods and systems for video authentication using watermarks based upon blockchain technology, random number generation, or a combination thereof. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the exemplary aspects as illustrated in the accompanying drawings. The same reference indicators will be used to the extent possible throughout the drawings and the following description to refer to the same items.

In recent years, blockchain technology has become popularized as the foundation underlying several cryptocurrencies (e.g., Bitcoin). A blockchain is a data structure that makes it possible to create a digital ledger of transactions that can then be shared among a distributed network of computers. It uses cryptographic methods that allow each participant in the network (e.g., "nodes") to manipulate the ledger in a secure way without the need for a central authority. In essence, blockchain is a peer-to-peer distributed ledger technology. In a standard blockchain implementation, once a block of data is entered into the ledger, it is extremely difficult (if not impossible) to manipulate or remove. When a computing node requests approval to add to the blockchain, participants in the network, each of which having a copy of the blockchain, are polled and run one or more algorithms to evaluate and validate the proposed transaction. If a majority of computing nodes, or a threshold number required for a given implementation, agree that the transaction appears in light of the current blockchain history then the transaction will be approved as a new block in the consensus blockchain.

This high-level description applies to many popular blockchain implementations. However, alternative blockchain configurations may be used that rely upon different consensus mechanisms. For example, the Bitcoin blockchain, is public and does not implement a permission scheme (i.e., anyone can participate and contribute to the ledger). Corporations, particularly banks, are exploring private or permission-based blockchain implementations wherein the network is made up only of known participants. With respect to the present disclosure, in order to provide increased accuracy and validity, in many implementations a blockchain technology should be selected that provides a reasonable level of validity (e.g., one that implements a stringent consensus mechanism). However, when practicing the methods disclosed herein any suitable blockchain system may be selected as dictated by the needs of a given implementation.

Alternative methods of video authentication disclosed herein rely upon the generation and use of random numbers. A variety of random number generators, and more specifically cryptographically secure pseudorandom number generators, are known and used in the fields of computer security and cryptography. When implementing the disclosed methods, any publicly available random number generator library may be used. Alternatively, a user may implement a novel random or cryptographically secure pseudorandom number generator, depending on the particular use case.

With respect to video recorders, the present methods are platform independent and generally compatible with any digital video recording technology that can be configured to allow watermarking of the recorded video data. In many aspects, the watermarking may be added contemporaneously with the recording of the video. However, in others, the watermarking may conceivably be added at a later time point.

Figure 1:
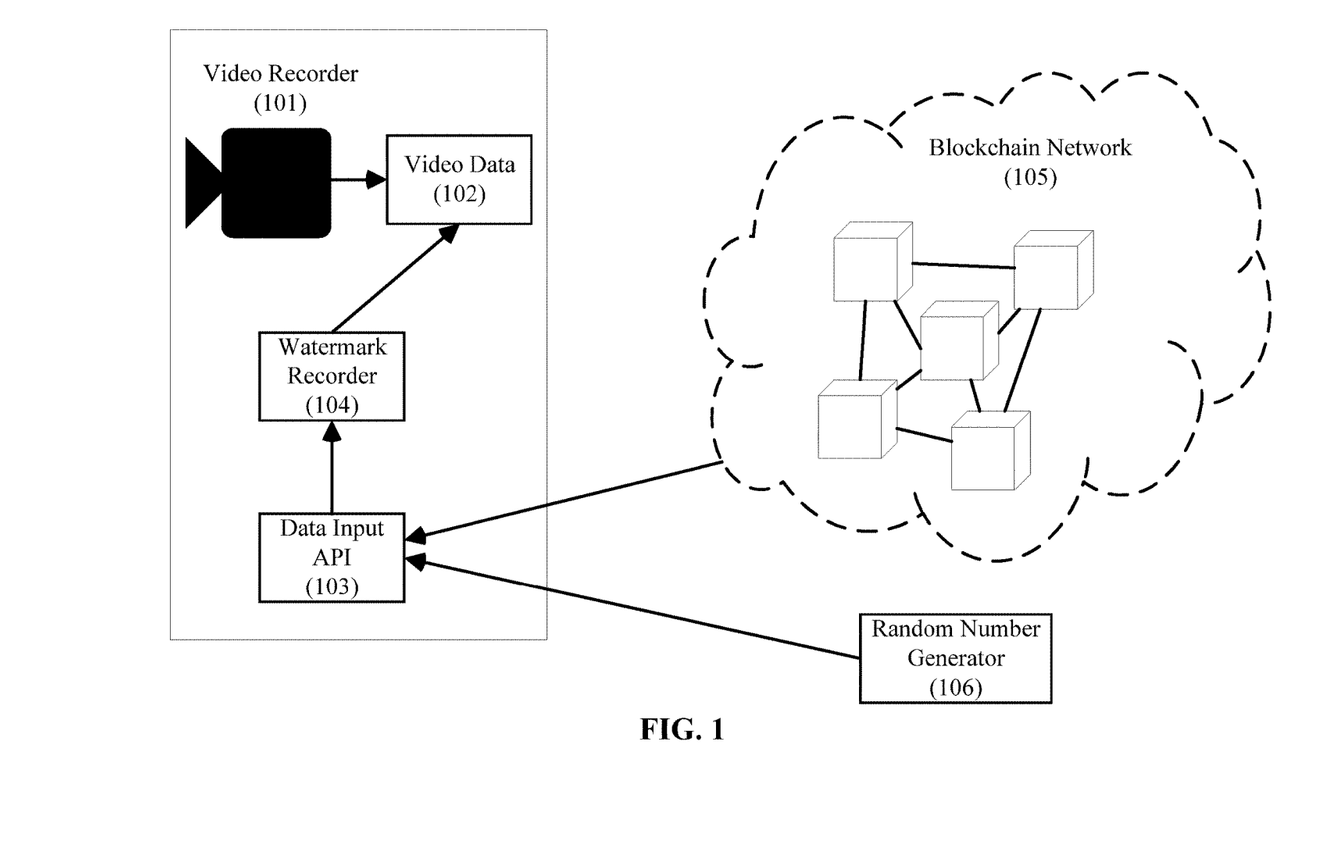
FIG. 1 is a block diagram illustrating a system for video authentication using watermarks according to an exemplary aspect of the disclosure.

While the present methods will be described in the context of watermarking video recordings, it is understood and appreciated that the present technology is not limited as such and may be used to watermark various other digital signals (e.g., streaming video, previously recorded video, digital audio transmissions, local or remote data streams, etc.). In the context of these other types of data and recordings, watermarking may be applied contemporaneously when a video or other digital signal is recorded or streamed, or at a later time, in accordance with any of the techniques described herein. For example, in the case of a digital audio recording, the methods may be implemented such that the watermark is applied to the audio data received from an audio recorded, analogous to the video camera (101) and video data (102) described in the following examples. Corresponding modifications are readily apparent for other data and signal types in order to apply watermarks to the data being recorded or transmitted.

FIG. 1 depicts an exemplary system for authenticating video according to one aspect of the disclosure. In this illustration a video camera (101) generates video data (102) which may be watermarked by a watermark recorded (104) configured to receive watermarking data via a data input API (103). The data input API, as shown in this diagram, may receive watermarking data from at least one of a blockchain network (105) or a random number generator (106). Note that for the purposes of this disclosure, a random number generator (106) may be a non-determinative random number generator, a cryptographically secure pseudorandom number generator, or an even a lower stringency random number generator, depending on the particular use case. In some aspects, a cryptographically secure pseudorandom number generator is preferred for increased validity. In some aspects, the random number generator will be an external source. However, a local source of random numbers may be implemented. In some aspects, the random number generator (106) may be configured to provide random numbers in real time, or alternatively at any selected interval (e.g., each second, every 5, 10 or 30 seconds, each minute, etc.). With respect to the blockchain network (105), any suitable blockchain-based ledger may be used, as described above. In some aspects, the blockchain network (105) selected for use with the disclosed methods is one that implements a high stringency consensus system for validating transactions (e.g., one that requires that a majority of polled computing nodes approve of a given transaction). The blockchain network (105) typically provides hashes of previous data blocks to the data input API (103) which may then be used as a watermark.

The blockchain network (105) and random number generator (106) provide a means for authenticating the watermarked video (or any other compatible digital signal or recording) because the watermarking data provided by these sources may be associated with a unique time point. For example, the random numbers provided by the random number generator correlate to the time point at which the numbers were generated. As such, a video recording watermarked with said numbers may be authenticated by comparison to a record of the numbers generated by the random number generator (106) over a given span of time. Similarly, when a blockchain network (105) is used for authentication, hashes of data blocks may be used as a watermark and correspond to an inner timestamp associated with the corresponding transaction in the blockchain ledger, resulting in a unique watermark that correlates to a specific time point. In some aspects, the watermark recorder (104) may receive both types of watermarking data from the data input API (103) and utilize both when generating a watermark for the video data (102). Such methods provide enhanced reliability and potentially more accurate timestamps because of the independent nature of these two watermarking data sources.

The watermark applied to the video data (102) by the watermark recorder (104) may be applied in any format compatible with the data structure of the video data (102). For example, the watermark may be applied as metadata (e.g., in a file header), or applied directly to the data for one or more video frames (e.g., as an overlay). As such, the watermark may be applied in a lossless or destructive manner, depending on the needs of a given implementation. The watermark may include additional information provided by the blockchain network (105) and/or the random number generator (106), or otherwise received by the data input API (103), such as a tentative time or data stamp or additional information regarding the source of the data (e.g., an IP address or other notation indicating the source). In some aspects, the watermark applied to the recording or data stream comprises a single time point (e.g., a start or an end point). In other aspects, it may comprise a plurality of single time points (e.g., a series of hashes and/or random numbers may be applied as discrete watermarks to a video recording at a recurring interval while the recording progresses). In still further aspects, the watermark may comprise a hash and/or random number indicating a start point as well as an end point in order to confirm that a given recording or data stream spanned a specific time interval.

As noted above, the watermarking methods disclosed herein may also be used with pre-recorded data, streaming audio or video, and any other compatible data stream that can be marked with a timestamp. For example, an audio (or other) data stream may allow for a watermark to be applied in an auxiliary channel used for metadata. Alternatively, the watermark may be applied directly to the data (e.g., by modifying the audio data in a manner that is imperceptible to a listener, but detectable by a computer). In a more general implementation, watermarks can conceivable be applied to packets, partitioned segments of a given data stream, or in any other manner compatible with a given transmission or recording format.

Figure 2:
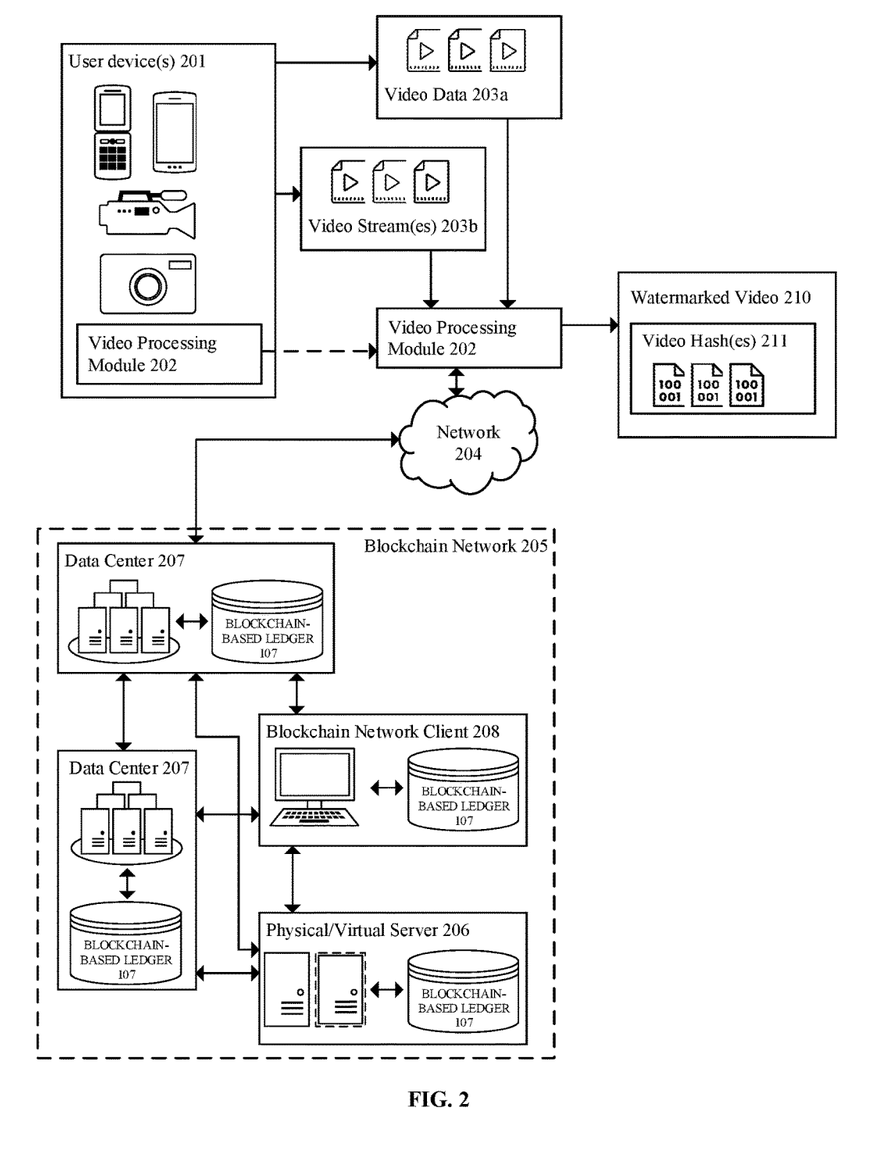
FIG. 2 is a block diagram illustrating a system for video authentication using watermarks according to an exemplary aspect of the disclosure.

FIG. 2 depicts an exemplary system for authenticating video according to one aspect of the disclosure. In this illustration a user device (201) such as but not limited to a video camera, mobile device, camera or other source of audio/visual content is used to generate content that may be watermarked in accordance with the disclosure. In this example, video data (203a) and a video stream (203b) are shown as exemplary types of content that may be watermarked. In other embodiments, audio data or any other data existing in a file or as a data stream may be used. Data to be watermarked (video data (203a) and a video stream (203b) in this example) may be processed by a Video Processing Module (202) which can be incorporated into the user Device (201) or part of a separate device such as but not limited to a local or remote computer/server. Both of these potential configurations are shown in this figure. In this example, the Video Processing Module (202) is configured to communicate directly or indirectly with a blockchain Network (205) via a Network (204). The blockchain network (205) may comprise one or more communicatively linked physical/virtual servers (206), data centers (207), or blockchain network clients (208). In this particular example, the Video Processing Module (202) is shown communicating with a given data center (207).

Some or all of these entities may be controlled by the operator of the block-chain based distributed ledger maintained via the blockchain network (205). In other aspects, one or more connected entities (e.g., clients) may be controlled or operated by the public. For example, the user device may also include software encoding a Video Processing Module (202) and a blockchain network client (208) capable of communicating with the blockchain-based distributed ledger. It is further understood that the entities forming the blockchain-based distributed ledger may comprise any combination of clients, servers, or data centers capable of storing a partial or complete copy of the blockchain-based distributed ledger (e.g., multiple secure data centers).

As shown by this figure, the Video processing Module (202) may receive data from the blockchain network (205) (e.g., hashes timestamps or other information associated with data blocks which form the distributed ledger) and utilize this information to generate a unique identifier that may be used to watermark the Video Data (203a) or Video Steam (203b). In this case, one or more Video Hash(es) (211) are embedded in the Video Data (203a) or Video Steam (203b) to generate Watermarked Video (210). However, as noted above an type of audio/video content may be processed systems and methods disclosed herein. Moreover, the watermark may comprise any suitable unique identifier(s), such as hashes or cryptographic signatures, serial numbers, timestamps, and/or random number. In some exemplary aspects, the unique identifier comprises information (e.g., a hash) stored in one or more blocks of the distributed ledger of the blockchain network (205). In some aspects, the system may further comprise a random number generator module as described above which can be included as a component of the Video Processing Module (202) or as a separate component. Random numbers generated using this module may also be used to generate the Watermarked Video (210), alone or in combination with information received from the blockchain network (205). For example, Watermarked Video (210) may include one or more watermarks based on or comprising a random number generated by the random number generator module and/or a cryptographic hash associated with a data block stored in the blockchain. In some aspects, the watermark(s) may also be based on or include a timestamp.

In some exemplary aspects, the Video Processing Module (202) may be further configured to analyze the audio, video or metadata of the content to be watermarked and to communicate some or all of the results of this analysis to the blockchain network (205). For example, in some exemplary aspects, the video data (203a) or video stream (203b) may be separated into individual files or data streams containing video, audio, and/or metadata content contained in the original video data (203a) or video stream (203b) (e.g., using a demultiplexer). Some or all of the demuxed data may be used to generate the hash(es) associated with the video data (203a) or video stream (203b), and/or subject to optional feature recognition. One or more hashes may be generated based all or a portion of the original video data (203a) or video stream (203b). In some aspects, a hash may be generated based upon an individual or subset of frames of the video data (203a) or video stream (203b). In some aspects, multiple hashes may be generated for a given video data (203a) or video stream (203b) by generating a hash at repeating time intervals (e.g., every 1, 10, 30 or 60 minutes). In some instances an even shorter interval (e.g., 0.5, 1, or 30 seconds) may be desirable. A timestamp or other useful information (e.g., location data) may also be included as part of the hash(es).

Optionally, one or more features of the one or more video frames or segments, audio data, and/or metadata associated with the video data (203a) or video stream (203b) may be identified using at least one machine learning or other algorithm. At least one hash associated with the video data (203a) or video stream (203b) may be generated based upon the one or more video frames or segments, audio data, and/or metadata associated with the video data (203a) or video stream (203b), with or without using the additional data generated by the optional feature recognition step. In some aspects, one or more of the hashes may be fuzzy hashes which may be used to identify similar, if not identical, matches. Once a hash has been generated for a given video data (203a) or video stream (203b), it may be stored in the distributed ledger of the blockchain network (205).

In some aspects the Video Processing Module (202) may generate one or more hashes associated with the video data (203a) or video stream (203b) and transmit this information to a computing node of the blockchain network (205) (e.g., a data center (207) communicatively linked to the blockchain network (205)). Upon receipt, this hash or hashes may be stored in one or more data blocks of the distributed ledger of the blockchain network (205). This archiving process may begin with the receipt, by a processor of a computing node, of one or more hashes associated with a video data (203a) or video stream (203b). A data block is then generated by the processor that contains at least one of the received hashes, by hashing a hash corresponding to a previous data block of the blockchain-based distributed ledger together with a hash corresponding to the contents of the data block being generated and a timestamp. In some aspects, the hashing process may omit the timestamp. In other aspects, additional information may be used, such as location data associated with the video data (203a) or video stream (203b) (e.g., GPS coordinates) or information associated with an individual or entity recorded by or participating in the video data (203a) or video stream (203b) content being hashed. It is understood that alternative hashing schemes may also be used, as are known in the art and implemented by previous blockchain-based distributed ledgers.

In any event, the computing node may then broadcast or otherwise transmit to a plurality of communicatively linked computing nodes, a message reporting the addition of the generated data block to the blockchain-based distributed ledger, wherein at least some of the computing nodes maintain at least a partial copy of the blockchain-based distributed ledger. As described above, these additional computing nodes may comprise other data centers, physical or virtual servers or clients able to communicate with the blockchain-based distributed ledger. Some or all of the computing nodes may be operated or controlled by the maintainer of the blockchain-based distributed ledger. In some aspects, some or all of the computing nodes may be controlled by members of the public.

In some aspects, one or more hashes (or other unique identifier(s)) may be received by the Video Processing Module (202) from the blockchain network (205) which is/are based on one or more hashes associated with the video data (203a) or video stream (203b) that were previously generated based on an analysis of the video data (203a) or video stream (203b) to be watermarked. These received hashes (or other unique identifier(s)) may in turn be used to watermark the video data (203a) or video stream (203b), such as by embedding the received hashes in the video data (203a) or video stream (203b). In other words, video data (203a) or video stream (203b) to be watermarked may be analyzed in order to generate hashes which are then transmitted to and stored in data blocks of the blockchain network (205) and hashes associated with these data blocks may then be used to watermark the corresponding video data (203a) or video stream (203b). Such systems may provide further assurance that a watermark is authentic as the watermark is based on information derived from the video data (203a) or video stream (203b), recorded in the blockchain (e.g., with a timestamp) and then used to watermark the associated video data (203a) or video stream (203b).

Figure 3:
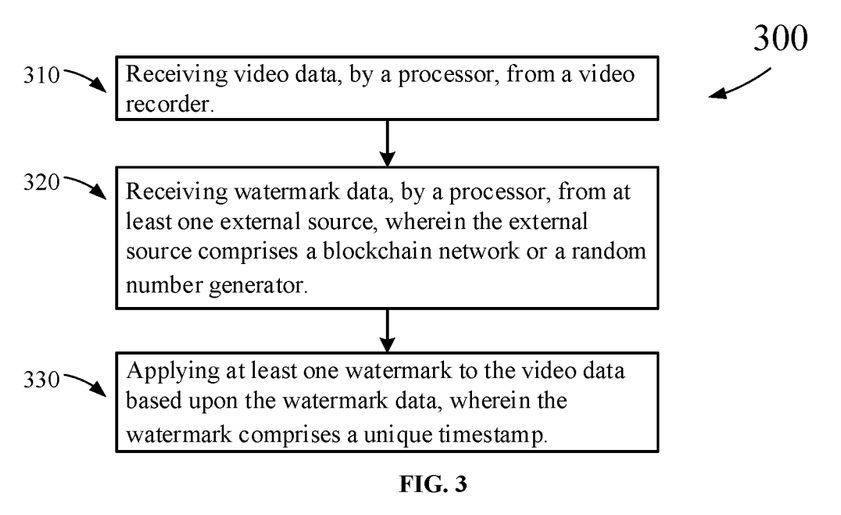
FIG. 3 is a flowchart illustrating a method for video authentication using a blockchain network or a random number generator according to an exemplary aspect of the disclosure.

FIG. 3 depicts an exemplary method for performing video authentication according to the present disclosure. The method 300 may be implemented by the exemplary systems shown in FIGS. 1 and 2. In the exemplary method illustrated by this figure, at step 310, video data is received by a processor, from the video recorder. At step 320, watermark data is received from at least one external source, wherein the external source comprises a blockchain network or a random number generator. Finally, at step 330, at least one watermark is applied to the video data based upon the watermark data, wherein the watermark comprises a unique timestamp. The exemplary method of FIG. 3 may be further modified as described in any of the various alternative aspects provided herein. For example, the watermark data may comprise at least one of: a hash associated with a unique data block in the blockchain network; or a cryptographically secure pseudorandom number. Similarly, the watermark may be applied to a metadata field associated with the video data, or applied in a nondestructive operation that does not degrade the visual quality of the video data.

It should be readily appreciated that the general method may be applied to other data sources in addition to recorded video, as described above. For example, the watermarking methods disclosed herein may also be used with pre-recorded data, streaming audio or video, and any other compatible data stream that can be marked with a timestamp.

Figure 4:
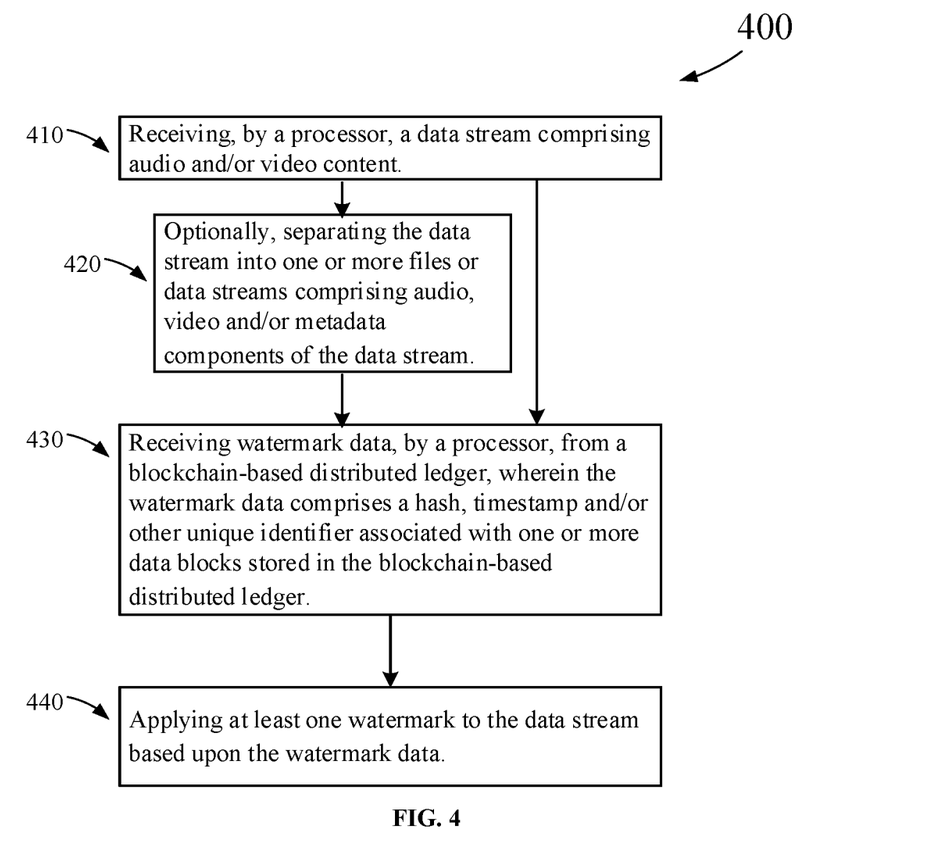
FIG. 4 is a flowchart illustrating a method for video authentication using a blockchain network or a random number generator according to another exemplary aspect of the disclosure.

FIG. 4 depicts another exemplary method for performing video authentication according to the present disclosure. In this example, at step 410 a data stream comprising audio and/or video content is received by a processor. This data stream may optionally be separated into one or more files or data streams comprising audio, video and/or metadata components of the data stream (e.g., via demultiplexing, step 420). At step 430, watermark data may be received by a processor, from a blockchain-based distributed ledger, wherein the watermark data comprises a hash, timestamp and/or other unique identifier associated with one or more data blocks stored in the blockchain-based distributed ledger. Thereafter, at step 440 at least one watermark may be applied to the data stream based upon the received watermark data.

Figure 5:
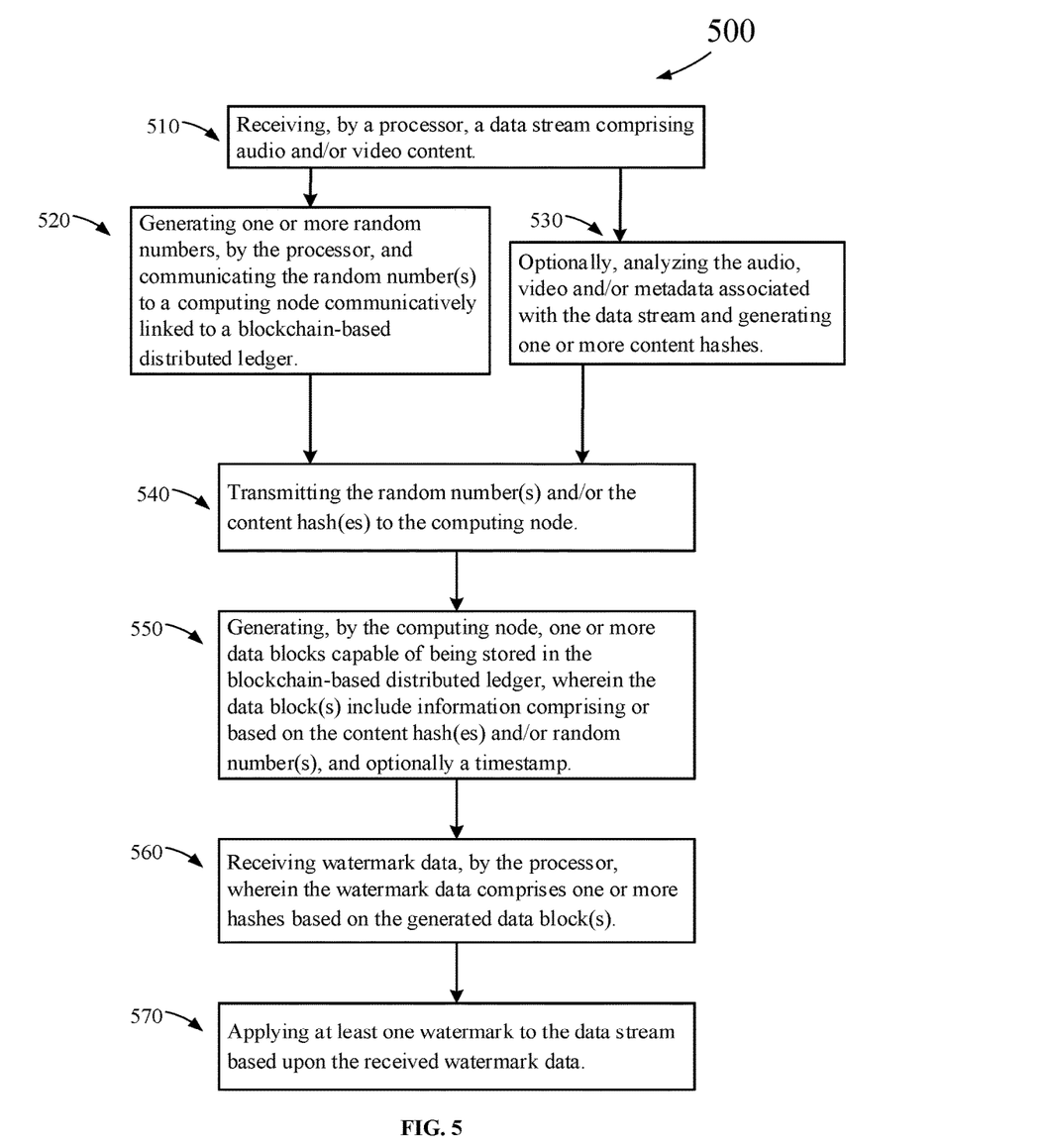
FIG. 5 is a flowchart illustrating a method for video authentication using a blockchain network or a random number generator according to another exemplary aspect of the disclosure.

FIG. 5 depicts another exemplary method for performing video authentication according to the present disclosure. As with the previous example, this exemplary method begins with receipt, by a processor, of a data stream comprising audio and/or video content at step 510. One or more random numbers may then be generated or otherwise provided to the processor, and communicated to a computing node communicatively linked to a blockchain-based distributed ledger, as shown by step 520. Optionally, at step 530 the audio, video and/or metadata associated with the data stream may be analyzed and used to generate one or more content hashes (e.g., based on individual frames or segments of the data stream or the whole data stream). It is understood that steps 520 and 530 may proceed in parallel or in sequence. In either case, the random number(s) and/or the content hash(es) to the computing node at step 540. The computing node may in turn generate one or more data blocks capable of being stored in the blockchain-based distributed ledger, wherein the data block(s) include information comprising or based on the content hash(es) and/or random number(s), and optionally a timestamp. This data block creates a record in the blockchain associated with the content of the data stream that may then be used to authenticate the data steam at a later date. At step 560, the processor may receive watermark data, wherein the watermark data comprises one or more hashes based on the generated data block(s). For example, a previously generated data block including information comprising or based on the content hash(es) and/or random number(s) may include a header hash used to link this data block to an adjacent data block in the blockchain. This header hash (or another hash associated with the data block) may be used to generate the watermark data. At step 570, this watermark data is used to generate a watermark which is then applied to the data stream. Using this process, data streams may be linked to one or more data blocks in a blockchain-based distributed ledger, providing a basis for authenticating the time that a data stream was transmitted and the authenticity of the content of the data stream.

Figure 6:
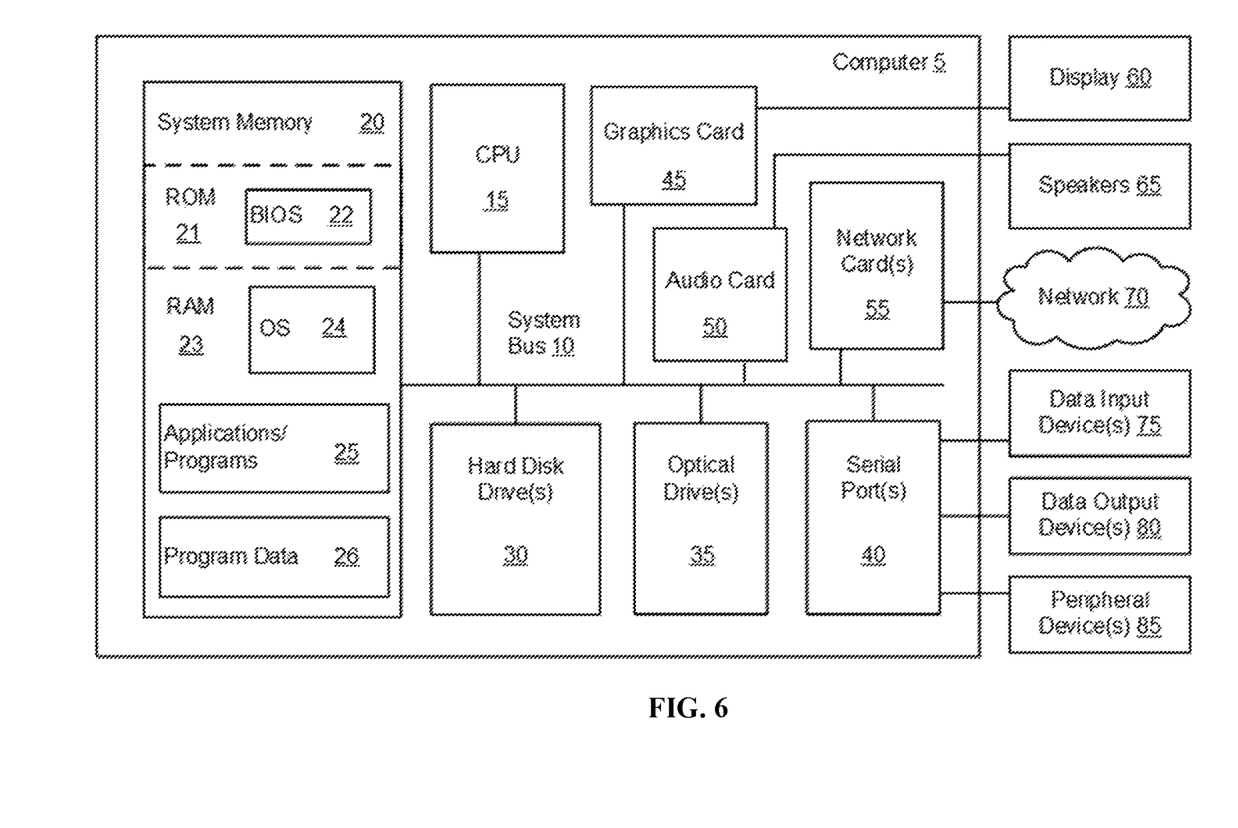
FIG. 6 is a block diagram illustrating an example general-purpose computer system on which the systems and methods for prioritization of backup and recovery traffic may be implemented.

FIG. 6 is a block diagram depicting an exemplary aspect of a computer system 5 that may be used to implement the disclosed system and method for performing data backup. The computer system 5 may include, but not limited to, a personal computer, a notebook, tablet computer, a smart phone, a mobile device, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In one example aspect, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

The terms "component" and "module" as used herein mean a real-world device, apparatus, or arrangement of components or modules implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A component or module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each component or module can be realized in a variety of suitable configurations, and should not be limited to any particular implementation exemplified herein.

In the interest of clarity, not all of the routine features of the aspects are disclosed herein. It will be appreciated that in the development of any actual implementation of the disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The exemplary aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for watermarking digital content, comprising:
   receiving, by a processor, a data stream comprising audio and/or video data;
   receiving watermark data, by a processor, from a computing node communicatively linked to a blockchain-based distributed ledger; and
   applying a plurality of watermarks to the data stream based upon the watermark data, wherein the plurality of watermarks comprise at least one hash based on one or more data blocks stored in the blockchain-based distributed ledger,
   applying the plurality of watermarks to the audio and/or video data at an intermittent time interval while the audio and/or video data is being recorded or transmitted.

2. The method of claim 1, wherein the watermark data further comprises:
   a random number;
   a cryptographically secure pseudorandom number; and/or
   a unique timestamp.

3. The method of claim 1, wherein at least one of the plurality of watermarks is applied to a metadata field associated with the data stream.

4. The method of claim 1, wherein the data stream comprises video data and at least one of the plurality of watermarks is applied to the video data in a nondestructive operation that does not degrade the visual quality of the video data.

5. The method of claim 1, wherein the time interval is selected from:
   a) one watermark per second;
   b) one watermark every 5, 10, 30, or 60 seconds; or
   c) an arbitrary interval selected by a user.

6. The method of claim 1, wherein at least one of the plurality of watermarks is based on or comprises at least one random number or hash associated with a unique data block in the blockchain-based distributed ledger, and wherein the data block comprises a timestamp associated with the time that the data stream was originally recorded or transmitted.

7. A computer-implemented system for watermarking digital content, comprising:
   a module configured to record or transmit a data stream comprising audio and/or video content; and
   a processor, configured to:
      receive the data stream comprising audio and/or video content;
      receive watermark data from a computing node communicatively linked to a blockchain-based distributed ledger; and
      apply a plurality of watermarks to the data stream based upon the watermark data at an intermittent time interval while the audio and/or video data is being recorded or transmitted, wherein the plurality of watermarks comprises at least one hash based on one or more data blocks stored in the blockchain-based distributed ledger.

8. The system of claim 7, wherein the watermark data further comprises:
   a random number;
   a cryptographically secure pseudorandom number; and/or
   a unique timestamp.

9. The system of claim 7, wherein the watermark is applied to a metadata field associated with the data stream.

10. The system of claim 7, wherein the data stream comprises video data and at least one of the plurality of watermarks is applied to the video data in a nondestructive operation that does not degrade the visual quality of the video data.

11. The system of claim 7, wherein the time interval is selected from:
   a) one watermark per second;
   b) one watermark every 5, 10, 30, or 60 seconds; or
   c) an arbitrary interval selected by a user.

12. The system of claim 7, wherein at least one of the plurality of watermarks is based on or comprises at least one random number or hash associated with a unique data block in the blockchain-based distributed ledger, and wherein the data block comprises a timestamp associated with the time that the data stream was originally recorded or transmitted.

13. A non-transitory computer readable medium storing computer-executable program instructions for watermarking digital content, comprising instructions for:
- receiving, by a processor, a data stream comprising audio and/or video data;
- receiving watermark data, by a processor, from a computing node communicatively linked to a blockchain-based distributed ledger; and
- applying a plurality of watermarks to the data stream based upon the watermark data, wherein the plurality of watermarks comprise at least one hash based on one or more data blocks stored in the blockchain-based distributed ledger,
- applying the plurality of watermarks to the audio and/or video data at an intermittent time interval while the audio and/or video data is being recorded or transmitted.

14. The non-transitory computer readable medium of claim 13, wherein the watermark data further comprises:
- a random number;
- a cryptographically secure pseudorandom number; and/or
- a unique timestamp.

15. The non-transitory computer readable medium of claim 13, wherein at least one of the plurality of watermarks is applied to a metadata field associated with the data stream.

16. The non-transitory computer readable medium of claim 13, wherein the data stream comprises video data and at least one of the plurality of watermarks is applied to the video data in a nondestructive operation that does not degrade the visual quality of the video data.

17. The non-transitory computer readable medium of claim 13, wherein the time interval is selected from:
a) one watermark per second;
b) one watermark every 5, 10, 30, or 60 seconds; or
c) an arbitrary interval selected by a user.

* * * * *